United States Patent
Kim et al.

(10) Patent No.: US 12,103,888 B2
(45) Date of Patent: Oct. 1, 2024

(54) METHODS FOR MAKING HIGH DENSITY VIAS IN A GLASS ARTICLE

(71) Applicant: CORNING INCORPORATED, Corning, NY (US)

(72) Inventors: Hoon Kim, Horseheads, NY (US); Jin Su Kim, Seoul (KR)

(73) Assignee: CORNING INCORPORATED, Corning, NY (US)

(*) Notice: Subject to any disclaimer, the term of this patent is extended or adjusted under 35 U.S.C. 154(b) by 956 days.

(21) Appl. No.: 17/040,204

(22) PCT Filed: Apr. 2, 2019

(86) PCT No.: PCT/US2019/025408
§ 371 (c)(1),
(2) Date: Sep. 22, 2020

(87) PCT Pub. No.: WO2019/195305
PCT Pub. Date: Oct. 10, 2019

(65) Prior Publication Data
US 2021/0009467 A1 Jan. 14, 2021

Related U.S. Application Data

(60) Provisional application No. 62/652,259, filed on Apr. 3, 2018.

(51) Int. Cl.
*C03C 15/00* (2006.01)
*C03C 3/087* (2006.01)
(Continued)

(52) U.S. Cl.
CPC .............. *C03C 15/00* (2013.01); *C03C 3/087* (2013.01); *C03C 3/091* (2013.01); *C03C 3/093* (2013.01);
(Continued)

(58) Field of Classification Search
CPC .... C03C 15/00; C03C 23/0005; H05K 3/0097
See application file for complete search history.

(56) References Cited

U.S. PATENT DOCUMENTS

| 4,130,680 A | 12/1978 | Ference et al. |
| 9,165,831 B2 | 10/2015 | Gambino et al. |

(Continued)

FOREIGN PATENT DOCUMENTS

| CN | 103295926 A | 9/2013 |
| CN | 103367285 A | 10/2013 |

(Continued)

OTHER PUBLICATIONS

Buch et al., "Design and Demonstration of Highly Miniaturized, Low Cost Panel Level Glass Package for MEMS", 67th Electronic Components and Technology Conference, 2017, pp. 1088-1097.
(Continued)

*Primary Examiner* — Erin Snelting
(74) *Attorney, Agent, or Firm* — Svetlana Z. Short

(57) ABSTRACT

A method for forming a via in a glass article includes forming one or more cavities within a glass substrate by exposing the glass substrate to an etchant, the glass substrate including a glass cladding layer and a glass central core layer, where the glass cladding layer has an etch rate in the etchant that is different than an etch rate of the glass central core layer, and where the one or more cavities extend through the glass central core layer terminating at the glass cladding layer, depositing a metallic material within the one or more cavities, and removing the glass cladding layer.

12 Claims, 9 Drawing Sheets

(51) Int. Cl.
  *C03C 3/091* (2006.01)
  *C03C 3/093* (2006.01)
  *C03C 3/097* (2006.01)
  *C03C 23/00* (2006.01)

(52) U.S. Cl.
  CPC .......... *C03C 3/097* (2013.01); *C03C 23/0005* (2013.01); *C03C 23/002* (2013.01); *C03C 23/0025* (2013.01)

(56) References Cited

U.S. PATENT DOCUMENTS

| | | | |
|---|---|---|---|
| 9,340,451 | B2 | 5/2016 | Boek et al. |
| 9,490,197 | B2 | 11/2016 | Farooq et al. |
| 2006/0027934 | A1 | 2/2006 | Edelstein et al. |
| 2014/0238078 | A1* | 8/2014 | Boek .................. C03C 21/002 65/33.2 |
| 2015/0313020 | A1 | 10/2015 | Takahashi et al. |
| 2016/0141237 | A1 | 5/2016 | Farooq et al. |
| 2017/0073266 | A1 | 3/2017 | Amosov et al. |

FOREIGN PATENT DOCUMENTS

| | | |
|---|---|---|
| GB | 2315266 A | 1/1998 |
| JP | 2000-178036 A | 6/2000 |
| KR | 10-2016-0016095 A | 2/2016 |
| KR | 10-2016-0144789 A | 12/2016 |
| TW | 201546981 A | 12/2015 |
| TW | 201615074 A | 4/2016 |
| TW | I572268 B | 2/2017 |
| WO | 00/79849 A1 | 12/2000 |
| WO | 2014/134097 A1 | 9/2014 |
| WO | 2015/031566 A1 | 3/2015 |
| WO | 2017/062798 A1 | 4/2017 |

OTHER PUBLICATIONS

Invitation to Pay Additional Fees of the International Searching Authority; PCT/US2019/025408; Mailed Jul. 17, 2019; 13 Pages; European Patent Office.

* cited by examiner

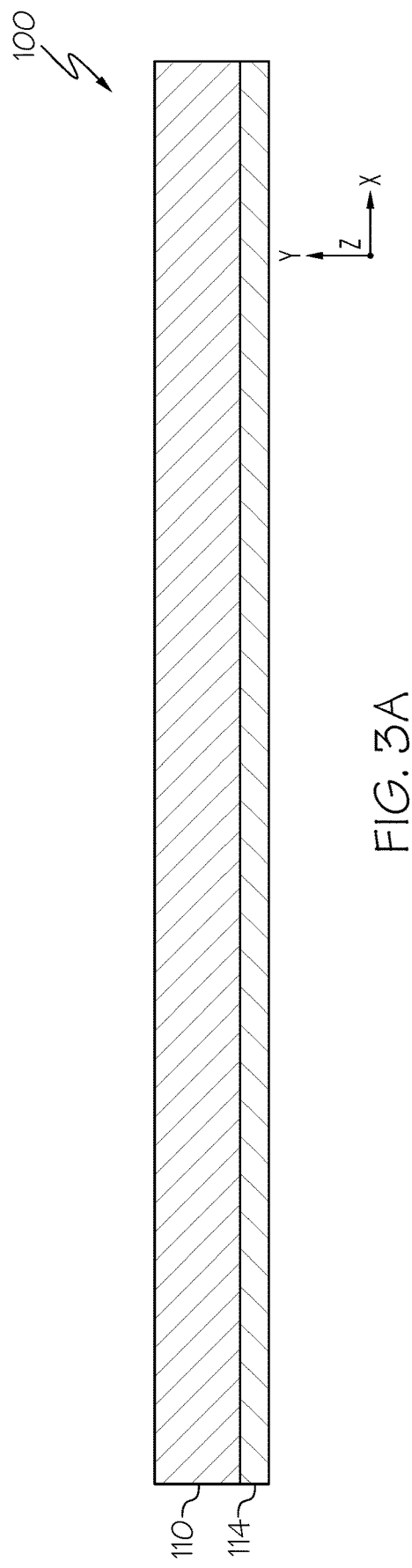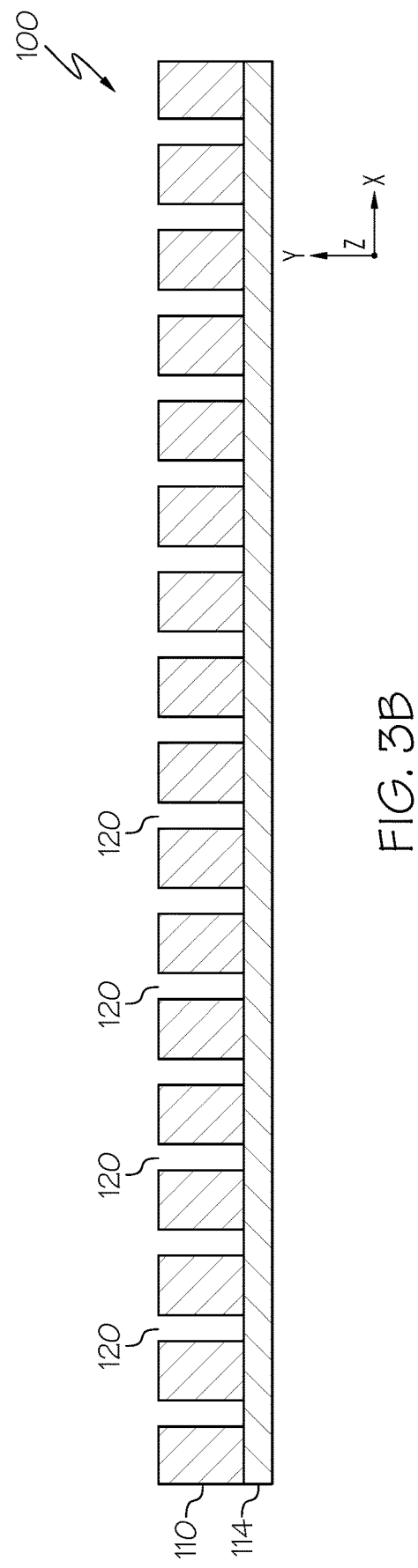

METHODS FOR MAKING HIGH DENSITY VIAS IN A GLASS ARTICLE

CROSS-REFERENCE TO RELATED APPLICATIONS

This application claims the benefit of priority under 35 U.S.C. § 371 of International Application No. PCT/US2019/025408, filed on Apr. 2, 2019, which claims the benefit of priority under 35 U.S.C. § 119 of U.S. Provisional Application No. 62/652,259, filed Apr. 3, 2018, the content of which is incorporated herein by reference in its entirety.

BACKGROUND

1. Field

This disclosure relates methods for making high density vias in glass articles.

2. Technical Background

Glass substrates and interposers have relatively low and stable dielectric constants and have coefficients of thermal expansion (CTEs) that are generally close to electronic components. Accordingly, glass substrates and interposers provide an attractive alternative to conventional polymer-based substrates and interposers for the mounting/packaging of electronic components. To form electrical and/or communicative connections through a glass substrate, metallic vias are positioned at various locations, extending through the thickness of the glass substrate. Conventional methods for forming the metallic vias include forming cavities that extend partially through the glass substrate (e.g., blind vias), and depositing metallic material within the cavities. The glass substrate is then polished, removing material from the glass substrate such that the cavities (now filled with metallic material) extend through the thickness of the glass substrate, thereby forming metallic vias.

Variations in the depth of the cavities may necessitate extensive polishing of the glass substrate such that the vias extend therethrough, which may increase manufacturing costs. Accordingly, a need exists for alternative methods for forming high density metallic vias in a glass substrate.

SUMMARY

In one embodiment, a method for forming a via in a glass article includes forming one or more cavities within a glass substrate by exposing the glass substrate to an etchant, the glass substrate including a glass cladding layer and a glass central core layer, where the glass cladding layer has an etch rate in the etchant that is different than an etch rate of the glass central core layer, and where the one or more cavities extend through the glass central core layer terminating at the glass cladding layer, depositing a metallic material within the one or more cavities, and removing the glass cladding layer.

In another embodiment, a method for forming a via in a glass article includes applying electromagnetic radiation to a glass substrate, the glass substrate including a glass cladding layer and a glass central core layer, where the glass cladding layer has a photosensitivity in response to application of the electromagnetic radiation that is different than a photosensitivity than the glass central core layer, forming one or more cavities extending through one of the glass cladding layer or the glass central core layer, and depositing metallic material within the one or more cavities.

In yet another embodiment, a method for forming a via in a glass article includes forming one or more cavities within a glass substrate by exposing the glass substrate to an etchant, the glass substrate including an upper glass cladding layer, a glass central core layer, and a lower glass cladding layer, where the one or more cavities extend through the upper glass cladding layer, and where the upper glass cladding layer and the lower glass cladding layer have an etch rate in the etchant that is different than an etch rate of the glass central core layer, depositing metallic material within the one or more cavities of the upper glass cladding layer, and removing the lower glass cladding layer from the glass substrate.

It is to be understood that both the foregoing general description and the following detailed description are merely exemplary, and are intended to provide an overview or framework to understanding the nature and character of the claimed subject matter. The accompanying drawings are included to provide a further understanding and are incorporated in and constitute a part of this specification. The drawings illustrate one or more embodiment(s), and together with the description, serve to explain principles and operation of the various embodiments.

BRIEF DESCRIPTION OF THE DRAWINGS

FIG. 3A schematically depicts a cross-section of a glass substrate including the lower glass cladding layer and a central glass core layer, according to one or more embodiments shown and described herein;

FIG. 3B schematically depicts the glass substrate of FIG. 3A with cavities formed within the glass substrate, according to one or more embodiments shown and described herein;

DETAILED DESCRIPTION

Figure 1A:
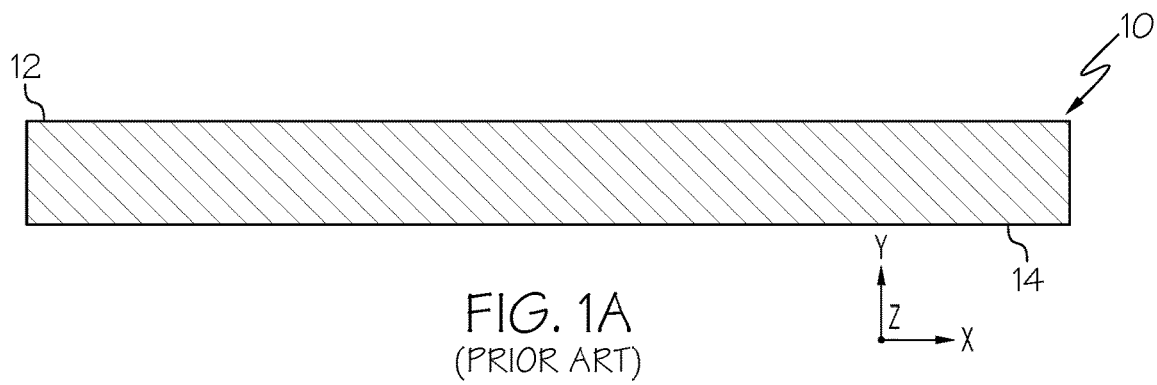
FIG. 1A schematically depicts a cross-section of a conventional glass substrate.

Reference will now be made in detail to exemplary embodiments which are illustrated in the accompanying drawings. Whenever possible, the same reference will be used throughout the drawings to refer to the same or like parts. The components in the drawings are not necessarily to scale, emphasis instead being placed upon illustrating the principles of the exemplary embodiments.

Numerical values, including endpoints of ranges, can be expressed herein as approximations preceded by the term "about," "approximately," or the like. In such cases, other embodiments include the particular numerical values. Regardless of whether a numerical value is expressed as an approximation, two embodiments are included in this disclosure: one expressed as an approximation, and another not expressed as an approximation. It will be further understood that an endpoint of each range is significant both in relation to another endpoint, and independently of another endpoint.

Embodiments herein are directed to methods for forming high density vias in a glass substrate. In particular, the embodiments described herein are directed to methods of forming high density vias by selectively forming cavities that extend through a layer of a glass substrate, filling the cavities with a metallic material, and selectively removing other layers of the glass substrate such that the cavities (now filled with the metallic material), extend through a thickness of the glass substrate. The glass substrate can have a variety of different configurations. In some embodiments, the glass substrate includes two or more layers of glass fused together. For example, the glass substrate can include a glass cladding layer fused to a glass base layer. In other examples, the glass substrate can include a glass base layer positioned between two glass cladding layers.

The different layers of the glass substrate may have different etch rates in an etchant and/or may have different photosensitivities. For example, the glass central core layer may have a comparatively low etch rate in a first etchant as compared to the glass cladding layers, such that the glass cladding layers may be selectively removed from the glass core layer when the glass substrate is exposed to the first etchant. The glass core layer may also be selected to have a comparatively high etch rate in a second etchant that is different than the first etchant, as compared to the glass cladding layers, such that cavities may be formed in the glass core layer without extending into the glass cladding layers when the glass substrate is exposed to the second etchant.

In some embodiments, the different layers of the glass substrate can have different photosensitivities. For example, the photosensitivity of a glass central core layer may be greater than that of cladding layers positioned on the glass central core layer, and vice versa. This makes it possible to selectively photomachine cavities within either the glass core layer or the cladding layers.

In comparison and referring to FIGS. 1A-1D, a conventional process for forming vias within a glass substrate 10 is schematically depicted. As shown in FIG. 1A, the glass substrate 10 is initially provided, the glass substrate 10 including an upper surface 12 and a lower surface 14 positioned opposite the upper surface 12. In conventional configurations, the glass substrate 10 may include a uniform glass, such that the composition of the glass substrate 10 is substantially the same throughout.

Figure 1B:
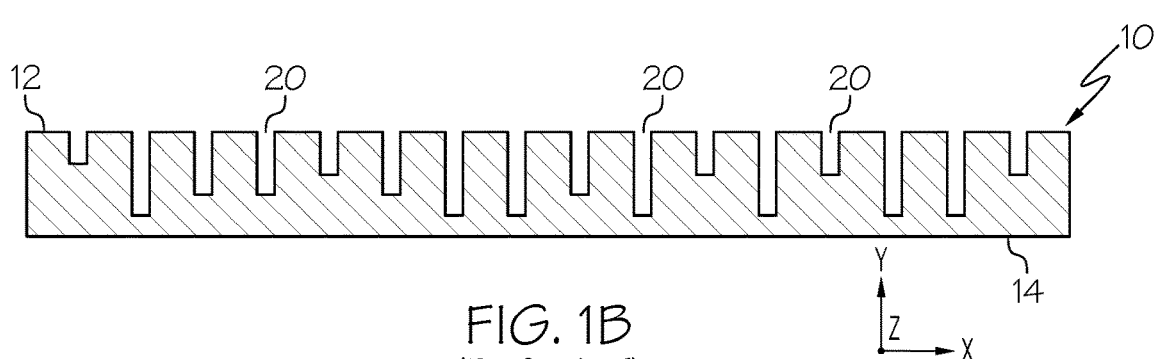
FIG. 1B schematically depicts the conventional glass substrate of FIG. 1A including multiple cavities formed therein.

Referring to FIG. 1B, a plurality of cavities 20 may be formed in the glass substrate 10, extending downward (e.g., in the −y-direction as depicted) from the upper surface 12 of the glass substrate 10 and partially through the thickness of the glass substrate 10. Conventional etching processes may involve wet etching, in which a mask is applied to the upper surface 12 of the glass substrate 10, leaving portions of the upper surface 12 exposed. The glass substrate 10 is then exposed to an etchant which selectively removes portions of the glass substrate 10 corresponding to the exposed portions of the upper surface 12 to form the plurality of cavities 20.

In the etching process, it is desirable to form cavities 20 that only extend partially through the glass substrate 10, so as to form a "blind via," so that the plurality of cavities 20 may be filled with a metallic material. In particular, by forming cavities 20 that extend only partially through the glass substrate 10, as compared to forming cavities 20 extending all the way through the thickness of the glass substrate 10, metallic material may be deposited and solidified within the cavities 20, as opposed to flowing through the cavities 20.

However, in conventional wet etching processes, it may be difficult to form cavities 20 that extend only partially through the glass substrate 10, while maintaining a consistent depth across the plurality of cavities 20. As shown in FIG. 1B, several of the cavities 20 may have a greater depth than others of the cavities 20, due to variations in the glass substrate 10 and/or the etchant.

Figure 1C:
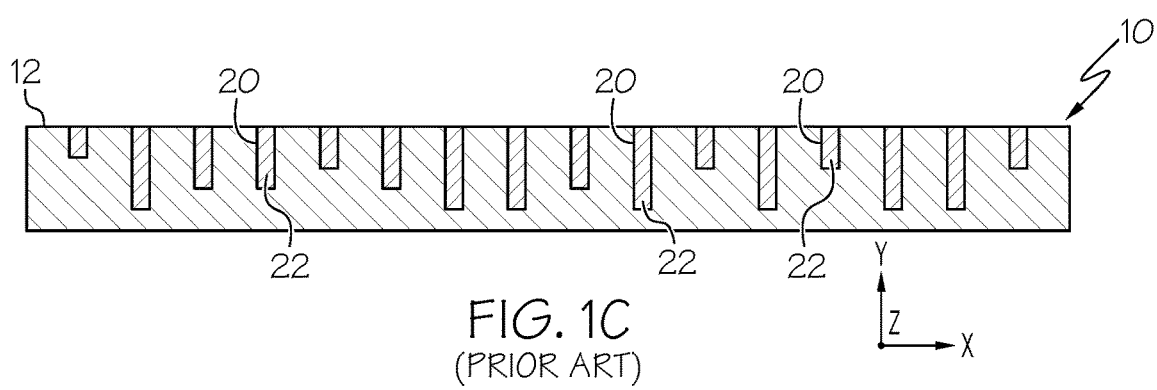
FIG. 1C schematically depicts the conventional glass substrate of FIG. 1B including metallic material positioned within the multiple cavities.

Referring to FIG. 1C, following the formation of the plurality of cavities 20, metallic material is deposited within the plurality of cavities 20 to form metallized vias 22.

Figure 1D:
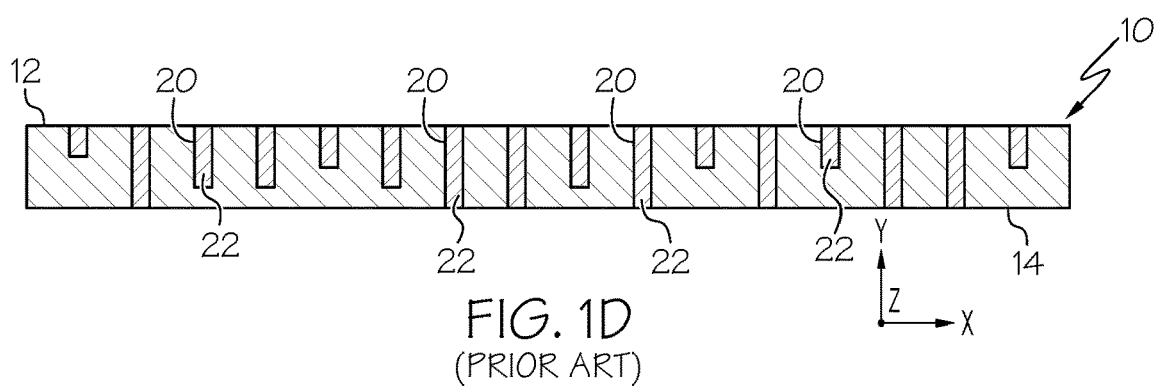
FIG. 1D schematically depicts the conventional glass substrate of FIG. 1C with a polished bottom surface.

Referring to FIG. 1D, once the metallic material is deposited within the plurality of cavities to form the mettalized vias 22, the lower surface 14 of the glass substrate 10 is polished to reduce the thickness of the glass substrate 10 (evaluated in the y-direction as depicted). Upon reducing the thickness of the glass substrate 10, at least some of the vias 22 may extend through the thickness of the glass substrate 10 to form a "through via." However, since each of the individual vias 22 have a different depth, it may be necessary to remove a significant amount of material from the lower surface 14 of the glass substrate 10 for each of the vias 22 to extend all the way through the thickness of the glass substrate 10. This polishing process is time-consuming and leads to increased manufacturing costs.

Figure 2:
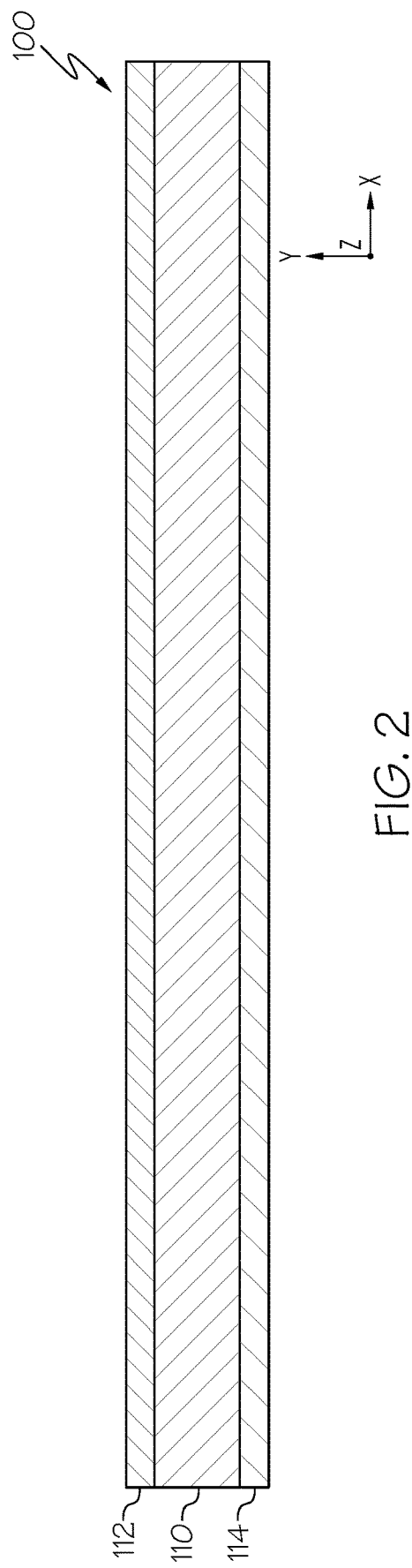
FIG. 2 schematically depicts a cross-section of a glass substrate including an upper glass cladding layer and a lower glass cladding layer, according to one or more embodiment shown and described herein.

By contrast and referring to FIG. 2, one embodiment of a glass substrate 100 for forming vias is depicted. The glass substrate 100 includes an upper glass cladding layer 112, a glass central core layer 110, and a lower glass cladding layer 114. The upper glass cladding layer 112 is coupled to a top surface of the glass central core layer 110 and is positioned above the glass central core layer 110 in the vertical direction (e.g., in the +y-direction as depicted). The lower glass cladding layer 114 is coupled to a bottom surface of the glass central core layer 110 and is positioned below the glass central core layer 110 in the vertical direction (e.g., in the −y-direction as depicted). In some embodiments, the glass central core layer 110, the upper glass cladding layer 112, and the lower glass cladding layer 114 are directly coupled to one another without any adhesives, polymer layers, coating layers or the like positioned between them, such as by fusing. In other embodiments, the glass central core layer 110, the upper glass cladding layer 112, and the lower glass cladding layer 114 are coupled to one another using adhesives or the like.

In embodiments, the glass central core layer 110 may have a thickness evaluated in the y-direction as depicted between about 100 micrometers (μm) and 200 μm, inclusive of the endpoints. The upper glass cladding layer 112 and the lower glass cladding layer 114 may have a thickness that is generally less than 50 μm. In some embodiments, the upper glass cladding layer 112 and the lower glass cladding layer 114 may have a thickness between 5 μm and 50 μm, inclusive of the endpoints. In other embodiments, the upper glass cladding layer 112 and the lower glass cladding layer 114 may have a thickness between 10 μm and 15 μm, inclusive of the endpoints. In some embodiments, the upper glass cladding layer 112 and the lower glass cladding layer 114 may have the same thickness, such that the glass substrate 100 is generally symmetric. In other embodiments, the thickness of the upper glass cladding layer 112 and the lower glass cladding layer 114 may be different from one another.

The glass central core layer 110, the upper glass cladding layer 112, and the lower glass cladding layer 114 can have any suitable composition of glass and be made using any suitable process. Examples of suitable glass compositions can include alkaline-earth aluminoborosilicate glasses, zinc borosilicate glasses, and soda-lime glass as well as glass ceramics, such as those enriched with magnesium oxide, yttria, beryllia, alumina, or zirconia. In general, the glass central core layer 110, the upper glass cladding layer 112, and the lower glass cladding layer 114 can have any of the compositions discussed in the '451 patent or the '266 application or be made using any of the processes discussed in the '451 patent or the '266 application, each of which is referenced at the end of the description.

In embodiments, at least one of the upper glass cladding layer 112, the lower glass cladding layer 114, and the glass central core layer 110 have different physical dimensions and/or glass compositions that allow for selective removal of at least one of the upper glass cladding layer 112 and the lower glass cladding layer 114, or the glass central core layer 110 from the glass substrate 100, as described in greater detail herein.

Referring to FIG. 3A, in one embodiment, the upper glass cladding layer 112 is initially removed from the glass substrate 100, such that the glass central core layer 110 and the lower glass cladding layer 114 remain. In embodiments, the upper glass cladding layer 112 may be exposed to a first etchant to remove the upper glass cladding layer 112 from the glass substrate 100. In these embodiments, the upper glass cladding layer 112 may have a higher etch rate in the first etchant than the glass central core layer 110.

In some embodiments, the upper glass cladding layer 112 and/or the lower glass cladding layer 114 etch at least 1.5 times faster, at least 2 times faster, at least 5 times faster, at least 10 times faster, at least 20 times faster, or at least 100 times faster than the glass central core layer 110 in the first etchant. Additionally, or alternatively, a ratio of the etch rate of the upper glass cladding layer 112 and/or the lower glass cladding layer 114 to the etch rate of the glass central core layer 110 is about 5, about 10, about 15, about 20, about 25, about 30, about 35, about 40, about 45, about 50, about 55, about 60, about 65, about 70, about 75, about 80, about 85, about 90, about 95, about 100, or any ranges defined by any combination of the stated values when exposed to the first etchant. In some embodiments, the glass central core layer 110 is not substantially etched during the removal of the upper glass cladding layer 112. Thus, the glass central core layer 110 serves as an etch stop in the first etchant.

Alternatively, in some embodiments, the glass substrate 100 may initially only include the glass central core layer 110 and a single glass cladding layer (e.g., the lower glass cladding layer 114 as depicted in FIG. 3A). In these embodiments, the initial step of removing the upper glass cladding layer 112 may be omitted.

Referring to FIG. 3B, a plurality of cavities 120 are formed within the glass substrate 100. In particular, the plurality of cavities 120 is formed within the glass central core layer 110 of the glass substrate 100. In some embodiments, the forming the cavities 120 comprises etching substantially entirely through the glass central core layer 110 with a second etchant to expose a portion of the lower glass cladding layer 114 at the bottom of the cavities 120. In embodiments, the lower glass cladding layer 114 is not substantially etched during the forming of the cavities 120 with the second etchant. Thus, the lower glass cladding layer 114 serves as an etch stop that determines the depth of the cavities 120. By forming an etch stop, each of the cavities 120 have substantially the same depth evaluated in the y-direction as depicted, extending entirely through the glass central core layer 110.

In particular, the cavities 120 may be formed through a wet etching process. For example, a mask may be applied to the top surface of the glass central core layer 110, the mask forming open regions corresponding to the positions of the cavities 120. Additionally or alternatively, the glass central core layer 110 may be exposed to an electromagnetic source, such as an ultraviolet (UV) laser, a contoured laser technology (CLT) laser, or the like, to form cracks in the glass central core layer 110 corresponding to the positions of the cavities 120. The glass central core layer 110 may then be exposed to the second etchant to enlarge the cracks and form the cavities 120.

In these embodiments, the lower glass cladding layer 114 has a different etch rate than the glass central core layer 110 in the second etchant, such that the lower glass cladding layer 114 is not substantially etched during the forming of the cavities 120. Thus, the lower glass cladding layer 114 serves as an etch stop that determines the depth of the cavities 120.

In some embodiments, the glass central core layer 110 may etch at least 1.5 times faster, at least 2 times faster, at least 5 times faster, at least 10 times faster, at least 20 times faster, or at least 100 times faster than the lower glass cladding layer 114 in the second etchant. Additionally, or alternatively, a ratio of the etch rate of the glass central core layer 110 to the lower glass cladding layer 114 is about 5, about 10, about 15, about 20, about 25, about 30, about 35, about 40, about 45, about 50, about 55, about 60, about 65, about 70, about 75, about 80, about 85, about 90, about 95, about 100, or any ranges defined by any combination of the stated values when exposed to the second etchant. In some embodiments, the lower glass cladding layer 114 is not substantially etched during the formation of the cavities 120. Thus, the lower glass cladding layer 114 serves as an etch stop in the second etchant.

While as depicted in the figures, the cavities 120 are formed in a regularly spaced pattern extending across the glass substrate 100, it should be understood that the cavities 120 may be formed in any suitable pattern throughout the glass substrate.

In some embodiments, the cavities 120 are formed within the glass central core layer 110 through a photomachining process. In these embodiments, the glass compositions of the lower glass cladding layer 114 and the glass central core layer 110 can vary such that the photosensitivity of the lower glass cladding layer 114 and the glass central core layer 110 is different. For example, it can be desirable for the glass central core layer 110 to have a higher photosensitivity than the lower glass cladding layer 114. The different photosensitivities between the glass central core layer 110 and the lower glass cladding layer 114 makes it possible to form the cavities 120 in the surface of the glass substrate 100. For example, the glass central core layer 110 can be sufficiently photosensitive that it can be photomachined to form the cavities 120. On the other hand, the lower glass cladding layer 114 can be sufficiently non-photosensitive that it is not susceptible to being photomachined.

In one example, the glass central core layer 110 is exposed to an electromagnetic source, such as a laser or the like, which passes over portions of the glass central core layer 110 corresponding to the positions of the cavities 120 depicted in FIG. 3B. The electromagnetic source may crystallize the glass central core layer 110 at the portions exposed to the electromagnetic source. However, the lower glass cladding layer 114 may be sufficiently non-photosensitive that it is not susceptible to the formation crystals upon application of the electromagnetic source. The portions of the glass central core layer 110 exposed to the electromagnetic source may subsequently be removed, such as by an etchant that selectively etches the crystallized portions of the glass central core layer 110 to form the cavities 120. As used herein, the term photosensitive means that upon the application of electromagnetic energy, regions the glass (e.g., the upper glass cladding layer 112, the lower glass cladding layer 114, and/or the glass central core layer 110) exposed to the electromagnetic energy, may crystallize such that the irradiated regions may have a higher etch rate in an etchant than regions of the glass that were not exposed to the electromagnetic energy. The term non-photosensitive means that the etch rate of the glass remains substantially constant regardless of the application of the electromagnetic energy.

Figure 3C:
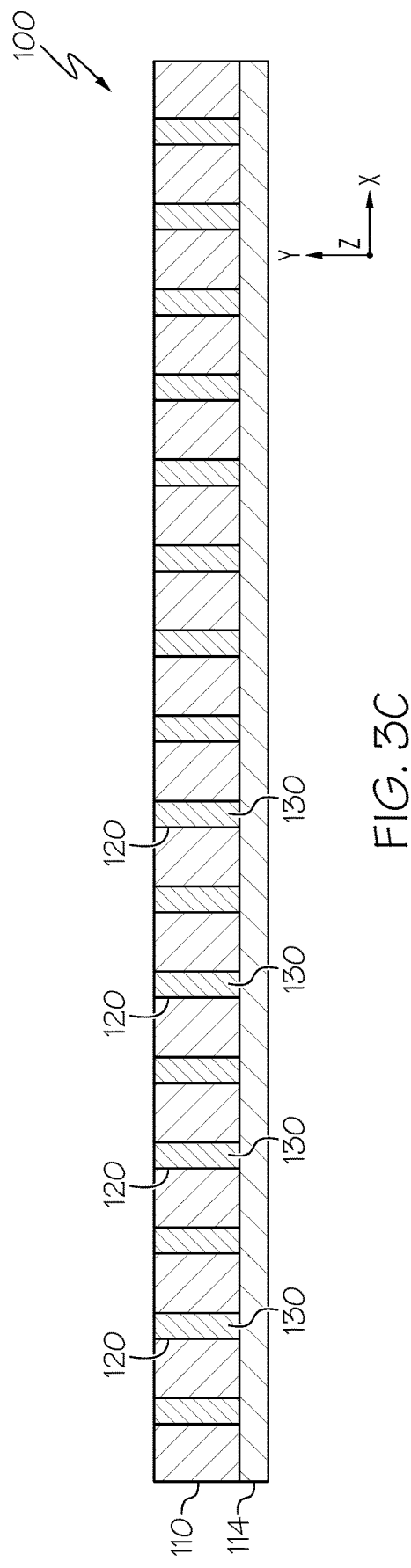
FIG. 3C schematically depicts the glass substrate of FIG. 3B with metallic material positioned within the cavities, according to one or more embodiments shown and described herein.

Referring to FIG. 3C, once the cavities 120 are formed, the cavities 120 are filled with a metallic material to form metallized vias 130. In embodiments, the metallic material may include any metal suitable for conducting electricity and/or thermal energy, such as copper or the like, and may be applied through any suitable process, such as directional sputtering, bottom-up plating, or the like. Because each of the cavities 120 extend to the lower glass cladding layer 114, when filled with the metallic material, each of the metallized vias 130 extend to the lower glass cladding layer 114 in the vertical direction (in the y-direction as depicted). In this way, each of the metallized vias 130 has substantially the same depth (evaluated in the y-direction as depicted).

Figure 3D:
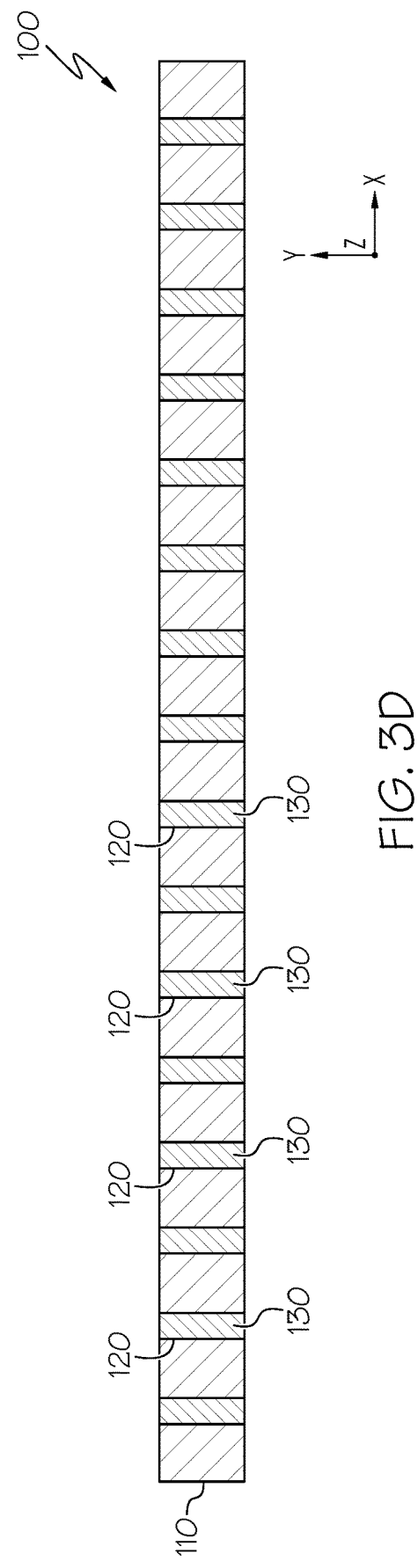
FIG. 3D schematically depicts the glass substrate of FIG. 3C with the lower glass cladding layer removed, according to one or more embodiment shown and described herein.

Referring to FIG. 3D, with the metallized vias 130 formed within the glass central core layer 110, the lower glass cladding layer 114 is removed. Similar to the upper glass cladding layer 112 (FIG. 2), the lower glass cladding layer 114 may have a higher etch rate in the first etchant than the glass central core layer 110, such that the lower glass cladding layer 114 may be removed from the glass substrate 100 in the first etchant, leaving the glass central core layer 110. While reference is made herein to a first etchant and a second etchant that are utilized to selectively remove or form cavities within the upper glass cladding layer 112, the glass central core layer 110, and the lower glass cladding layer 114, it should be understood that any number or combination of different etchants may be utilized to selectively remove or form cavities within the upper glass cladding layer 112, the glass central core layer 110, and the lower glass cladding layer 114. For example, the etchant used to remove the upper glass cladding layer 112 may or may not be the same as the etchant used to remove the lower glass cladding layer 114 from the glass central core layer 110.

As each of the metallized vias 130 extend to the lower glass cladding layer 114, once the lower glass cladding layer 114 is removed, each of the metallized vias 130 extend through the thickness of the glass substrate 100. Because each of the metallized vias 130 extend through the thickness of the glass substrate 100 following the removal of the lower glass cladding layer 114, polishing of the glass substrate 100, as would be conventionally required to form metallized vias 130 extending through the thickness of the glass substrate 100 may be reduced or eliminated, thereby reducing the time and processing required to form the metallized vias 130.

Figure 4A:
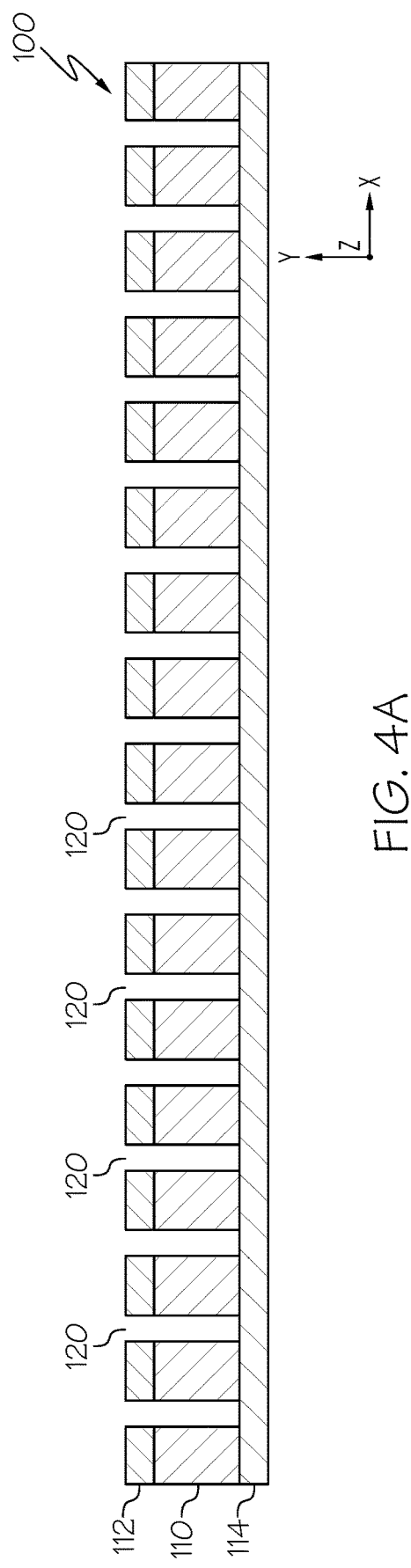
FIG. 4A schematically depicts the glass substrate of FIG. 2 with cavities formed within the glass substrate, according to one or more embodiments shown and described herein.

Referring to FIGS. 2 and 4A, in another embodiment, the cavities 120 may be formed through the upper glass cladding layer 112 and the glass central core layer 110. Similar to the embodiment described above with respect to FIGS. 3A-3D, the cavities 120 may be formed through the glass central core layer 110 through a photomachining process or a wet etching process. In the embodiment depicted in FIG. 4A, instead of removing the upper glass cladding layer 112, the cavities 120 may be formed within the upper glass cladding layer 112. To form the cavities 120 within the upper glass cladding layer 112, the upper glass cladding layer 112 may be exposed to a photomachining process or a wet etching process as described above.

In embodiments in which the cavities 120 are formed within the upper glass cladding layer 112 and the glass central core layer 110, the upper glass cladding layer 112 and the glass central core layer 110 may be formed of the same material, such that the upper glass cladding layer 112 and the glass central core layer 110 may be exposed to the same photomachining process or wet etching process to form the cavities 120. In other embodiments, such as when the upper glass cladding layer 112 and the lower glass cladding layer 114 are formed of the same material and the glass central core layer 110 is formed of a different material, the cavities 120 may be formed in the upper glass cladding layer 112 and the glass central core layer 110 through different processes. In one embodiment, the cavities 120 are initially formed in the upper glass cladding layer 112 through a wet etching process, as described above with respect to FIG. 3B, by exposing the upper glass cladding layer 112 to a first etchant in which the upper glass cladding layer 112 has a higher etch rate than the glass central core layer 120. In this embodiment, the cavities 120 are then formed in the glass central core layer 120 with a second etchant in which the glass central core layer 120 has a higher etch rate than the lower glass cladding layer 114.

As described above with reference to FIGS. 3B-3D, the lower glass cladding layer 114 may have a lower etch rate in the second etchant used to form the cavities 120 in the glass central core layer 110, allowing the cavities 120 to be formed only within and entirely through the glass central core layer 110, with the lower glass cladding layer 114 acting as an etch stop. Each of the cavities 120 have substantially the same depth (evaluated in the y-direction) as each of the cavities 120 extend to the lower glass cladding layer 114 through the glass central core layer 110.

Figure 4B:
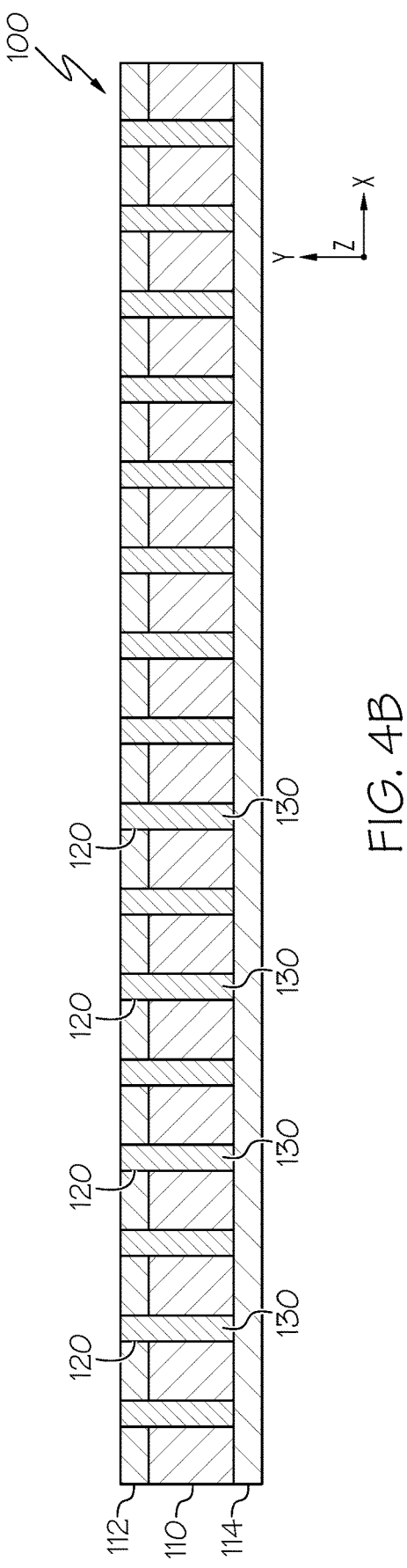
FIG. 4B schematically depicts the glass substrate of FIG. 4A with metallic material positioned within the cavities, according to one or more embodiments shown and described herein.

Referring to FIG. 4B, subsequent to the formation of the cavities 120, the cavities 120 are then filled with metallic material to form metallized vias 130. Similar to the embodiment described above with respect to FIG. 3C, as each of the cavities 120 extend the same depth (evaluated in the y-direction), each of the metallized vias 130 have substantially the same depth.

Figure 4C:
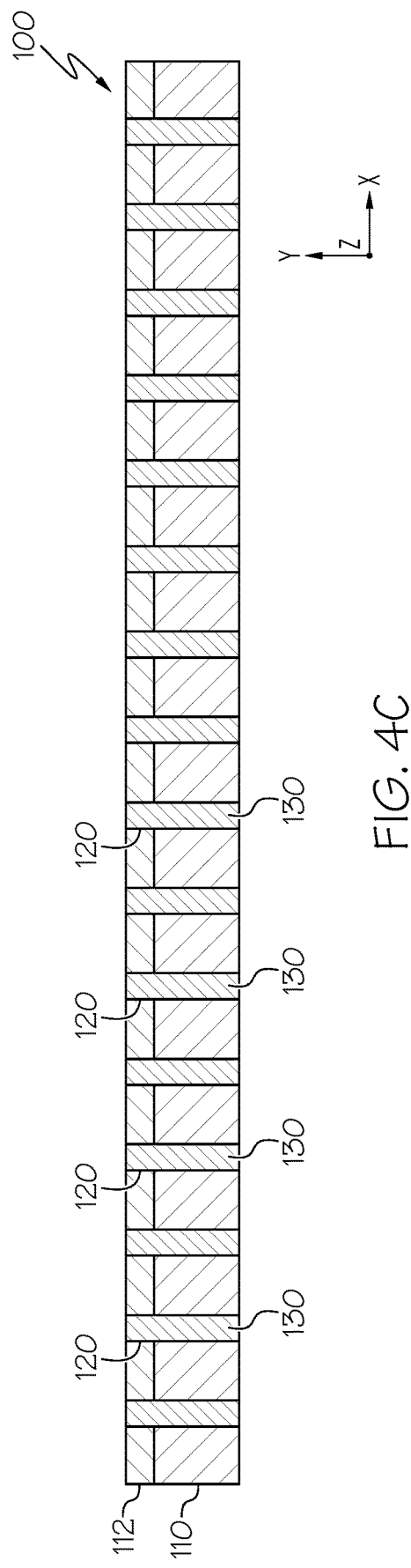
FIG. 4C schematically depicts the glass substrate of FIG. 4B with the lower glass cladding layer removed, according to one or more embodiments shown and described herein.

Referring to FIG. 4C, once the metallized vias 130 are formed within the glass central core layer 110 and the upper glass cladding layer 112, the lower glass cladding layer 114 is removed. As described above in the embodiment depicted in FIG. 3D, the lower glass cladding layer 114 may have a higher etch rate in a selected etchant than the glass central core layer 110, such that the lower glass cladding layer 114 may be removed from the glass substrate 100 in the etchant, leaving the glass central core layer 110. Because each of the metallized vias 130 extend to the lower glass cladding layer 114, once the lower glass cladding layer 114 is removed, each of the metallized vias 130 extend through the thickness of the glass substrate 100. Because each of the metallized vias 130 extend through the thickness of the glass substrate 100 following the removal of the lower glass cladding layer 114, polishing of the glass substrate 100 as would conventionally be required to form metallized vias 130 extending through the thickness of the glass substrate 100 may be reduced or eliminated, thereby reducing the time and processing required to form the metallized vias 130. By forming the cavities 120 through the upper glass cladding layer 112, the thickness (evaluated in the y-direction) of the glass substrate including the metallized vias 130 may be increased as compared to embodiments in which the upper glass cladding layer 112 is removed at the outset, which may be desirable in applications requiring a thicker glass substrate 100.

Figure 5:
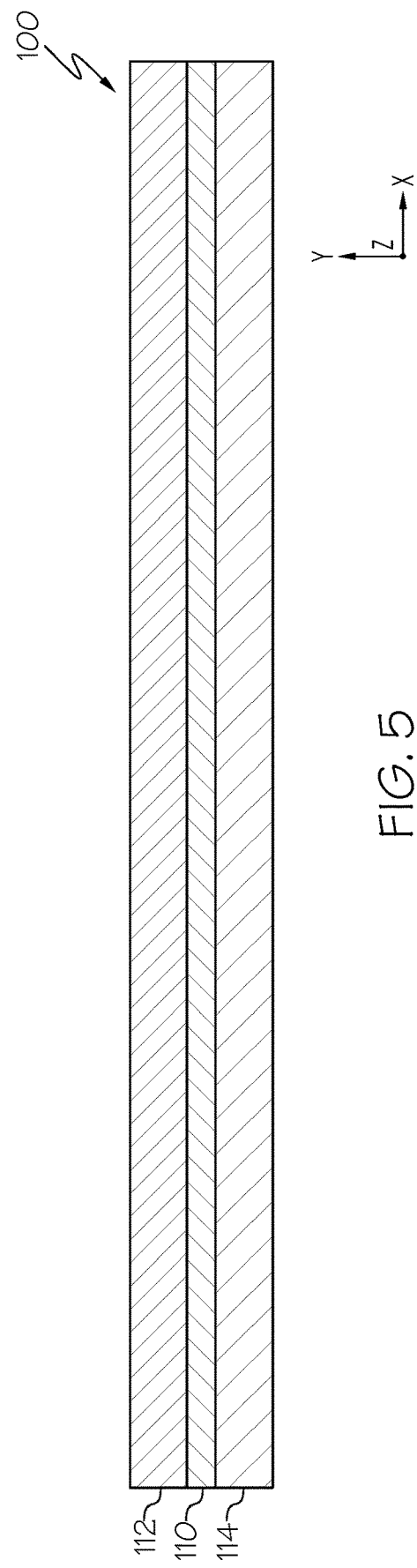
FIG. 5 schematically depicts a cross-section of another glass substrate including an upper glass cladding layer and a lower glass cladding layer, according to one or more embodiments shown and described herein.
Figure 6A:
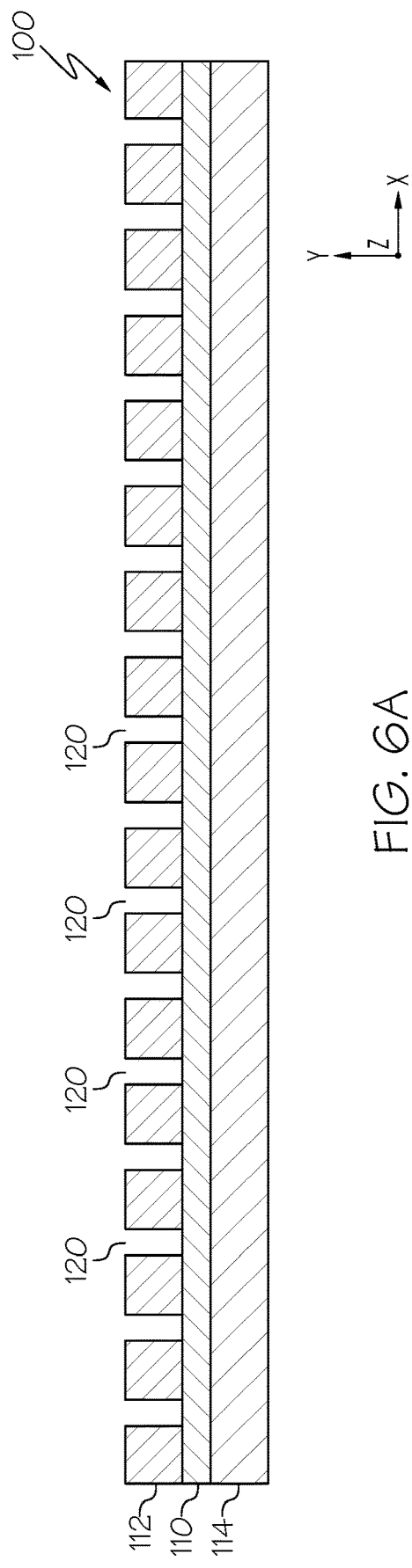
FIG. 6A schematically depicts the glass substrate of FIG. 5 with cavities formed within the upper glass cladding layer, according to one or more embodiments shown and described herein.

Referring to FIGS. 5 and 6A, another embodiment of a glass substrate 100 is schematically depicted. The glass substrate 100 includes the upper glass cladding layer 112, the glass central core layer 110, and optionally includes a lower glass cladding layer 114. The central glass core layer 110 may have a thickness that is less than 100 µm in the embodiment depicted in FIG. 5. In the embodiment depicted in FIGS. 5 and 6A, the cavities 120 are formed within the upper glass cladding layer 112, extending downward to the glass central core layer 110. The cavities 120 may be formed through a photomachining process or a wet etching process, as described above. To form the cavities 120 extending to the glass central core layer 110, as described above, the upper glass cladding layer 112 may be photosensitive, while the glass central core layer 110 is non-photosensitive.

Figure 6B:
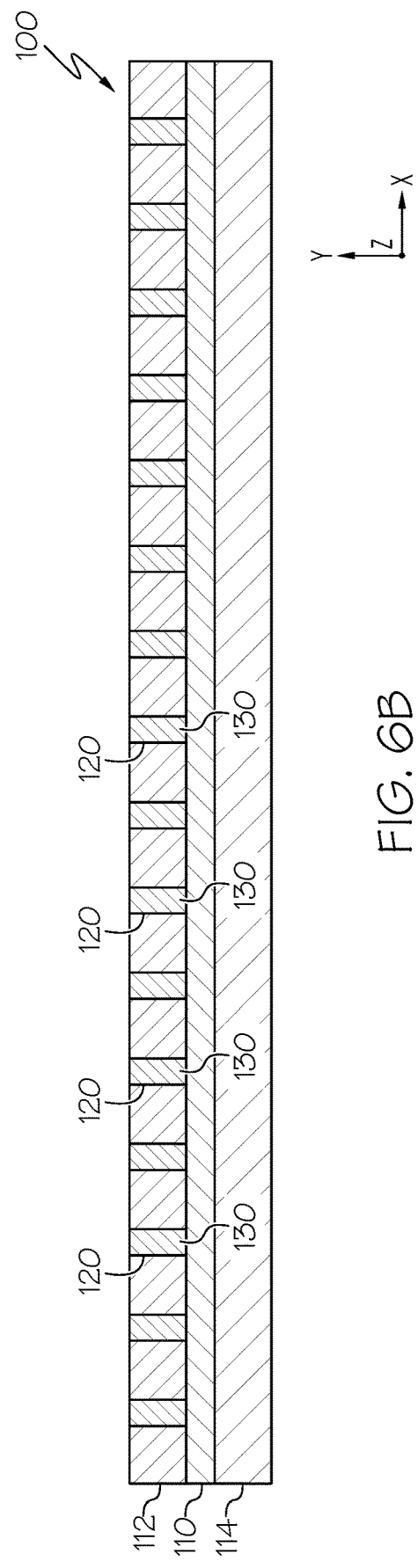
FIG. 6B schematically depicts the glass substrate of FIG. 6A with metallic material positioned within the cavities, according to one or more embodiments shown and described herein.
Figure 6C:
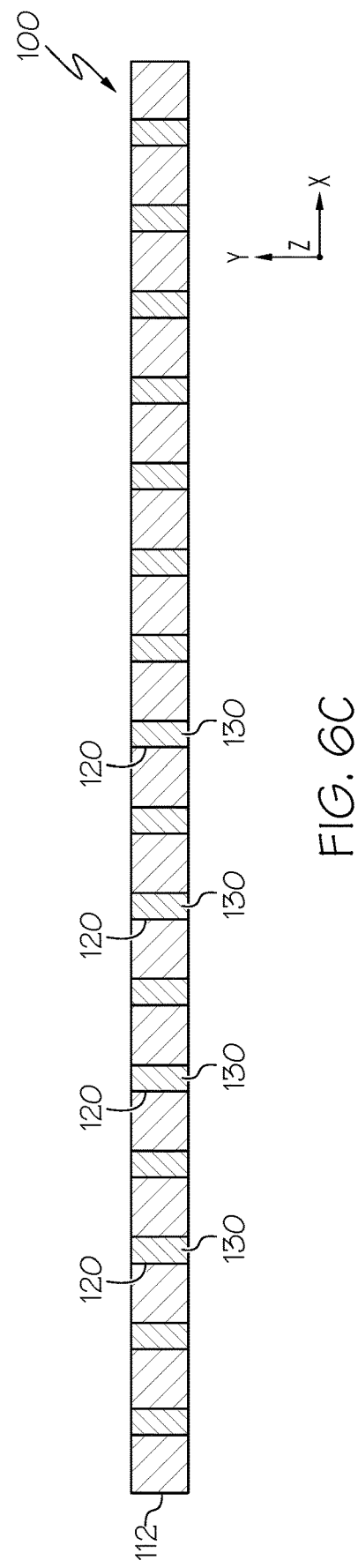
FIG. 6C schematically depicts the glass substrate of 6B with the lower glass cladding layer removed, according to one or more embodiments shown and described herein.

Referring collectively to FIGS. 6B and 6C and as described above with respect to other embodiments, the cavities 120 may then be filled with a metallic material to form the metallized vias 130 extending through the upper glass cladding layer 112. In the embodiment depicted in FIG. 6B, the metallized vias 130 extend through the upper glass cladding layer 112 to the glass central core layer 110. Subsequent to filling the cavities 120 with the metallic material, the glass central core layer 110 may be removed, such as through a wet etching process that selectively removes the glass central core layer 110 leaving the upper glass cladding layer 112. As described above, in embodiments the upper glass cladding layer 112 has a thickness (evaluated in the y-direction as depicted) that is generally less than 50 µm. By forming the metallized vias 130 through the upper glass cladding layer 112, the glass substrate 100 may have a small thickness (evaluated in the y-direction as depicted), as compared to embodiments which retain the central glass core layer 110, which may be desirable in applications in which the glass substrate 100 is required to have a small thickness.

While the metallized vias 130 are depicted as being formed within the upper glass cladding layer 112, and the central glass core layer 110 and optional lower glass cladding layer 114 are removed from the glass substrate 100, it should be understood that the upper glass cladding layer 112 could optionally be provided, and the metallized vias 130 could be formed in the lower glass cladding layer 114 with the central glass core layer 110 and the optional upper glass cladding 112 being removed.

It should now be understood that embodiments described herein are directed to methods for forming high density vias in a glass substrate. In particular, the embodiments described herein are directed to methods of forming high density vias by selectively forming cavities that extend through a layer of a glass substrate, filling the cavities with a metallic material, and selectively removing other layers of the glass substrate such that the cavities (now filled with the metallic material), extend through a thickness of the glass substrate. By selectively removing layers of the glass substrate, polishing of the glass substrate, as is conventionally required to form vias extending through the glass substrate, may be reduced or eliminated.

Terminology and Interpretative Norms

The term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

The terms "glass" and "glass composition" encompass both glass materials and glass-ceramic materials, as both classes of materials are commonly understood. Likewise, the term "glass structure" encompasses structures comprising glass. The term "reconstituted wafer- and/or panel-level package" encompasses any size of reconstituted substrate package including wafer level packages and panel level packages.

The term "surface roughness" means Ra surface roughness determined as described in ISO 25178, Geometric Product Specifications (GPS)-Surface texture: areal, filtered at 25 µm unless otherwise indicated. The surface roughness values reported herein were obtained using a Keyence confocal microscope.

The term "formed from" can mean one or more of comprises, consists essentially of, or consists of. For example, a component that is formed from a particular material can comprise the particular material, consist essentially of the particular material, or consist of the particular material.

Spatial or directional terms, such as "left," "right," "front," "back," and the like, relate to the subject matter as it is shown in the drawings. However, it is to be understood that the described subject matter may assume various alternative orientations and, accordingly, such terms are not to be considered as limiting.

Articles such as "the," "a," and "an" can connote the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, and the like, used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should be construed in light of the number of recited significant digits and by applying ordinary rounding techniques.

All disclosed ranges are to be understood to encompass and provide support for claims that recite any and all subranges or any and all individual values subsumed by each range. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

All disclosed numerical values are to be understood as being variable from 0-100% in either direction and thus provide support for claims that recite such values or any and all ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range (e.g., 15.2).

The drawings shall be interpreted as illustrating one or more embodiments that are drawn to scale and/or one or more embodiments that are not drawn to scale. This means the drawings can be interpreted, for example, as showing: (a) everything drawn to scale, (b) nothing drawn to scale, or (c) one or more features drawn to scale and one or more features not drawn to scale. Accordingly, the drawings can serve to provide support to recite the sizes, proportions, and/or other dimensions of any of the illustrated features either alone or relative to each other. Furthermore, all such sizes, proportions, and/or other dimensions are to be understood as being variable from 0-100% in either direction and thus provide support for claims that recite such values or any and all ranges or subranges that can be formed by such values.

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "invention," etc., are not meant to invoke exception (b) or otherwise restrict the scope of the recited claim terms. Other than situations where exception (b) applies, nothing contained in this document should be considered a disclaimer or disavowal of claim scope.

The subject matter recited in the claims is not coextensive with and should not be interpreted to be coextensive with any embodiment, feature, or combination of features described or illustrated in this document. This is true even if only a single embodiment of the feature or combination of features is illustrated and described in this document.

INCORPORATION BY REFERENCE

The entire contents of each of the documents listed below are incorporated by reference into this document. If the same term is used in both this document and one or more of the incorporated documents, then it should be interpreted to have the broadest meaning imparted by any one or combination of these sources unless the term has been explicitly defined to have a different meaning in this document. If there is an inconsistency between any of the following documents and this document, then this document shall govern. The incorporated subject matter should not be used to limit or narrow the scope of the explicitly recited or depicted subject matter.

- U.S. Pat. No. 9,340,451 (application Ser. No. 13/798,479), titled "Machining of Fusion-Drawn Glass Laminate Structures Containing a Photomachinable Layer," filed on 13 Mar. 2013, issued on 17 May 2016 (the '451 patent);
- U.S. Pat. App. Pub. No. 2017/0073266 (application Ser. No. 15/125,453), titled "Glass Article and Method for Forming the Same," filed on 12 Mar. 2015, published on 16 Mar. 2017 (the '266 application).

EXAMPLES

Various embodiments will be further clarified by the following examples.

A plurality of core glass compositions, which can be suitable for use as a core glass layer of a structured article, were prepared according to the batch compositions listed in Table 1 below. Batches of the oxide constituent components were mixed, melted, and formed into glass plates. The properties of the glass melt and the resultant structured article were measured and the results are reported in Table 2. The etch rates reported in Table 2 are expressed in terms of weight loss relative to the original weight of the sample after contact by a 50 vol % aqueous HCl solution at 60° C. in an ultrasonic bath for 30 min.

TABLE 1

Exemplary Core Glass Compositions

| Sample | SiO$_2$ (mol %) | Al$_2$O$_3$ (mol %) | B$_2$O$_3$ (mol %) | Na$_2$O (mol %) | K$_2$O (mol %) | MgO (mol %) | CaO (mol %) | SnO$_2$ (mol %) |
|---|---|---|---|---|---|---|---|---|
| 1-1 | 66 | 10.26 | 0.58 | 14.23 | 2.37 | 5.75 | 0.59 | 0.21 |
| 1-2 | 69.18 | 8.47 | 0 | 13.92 | 1.16 | 6.54 | 0.53 | 0.19 |
| 1-3 | 68.84 | 10.63 | 0 | 14.86 | 0.02 | 5.43 | 0.04 | 0.17 |
| 1-4 | 67.45 | 12.69 | 3.67 | 13.67 | 0.02 | 2.36 | 0.03 | 0.09 |

TABLE 2

Properties of Exemplary Core Glass Compositions

| Sample | Etch Rate (%) | CTE (×10$^{-7}$/°C.) | Liquidus Temp (°C.) | Liquidus Visc (kP) | Strain Pt (°C.) | Anneal Pt (°C.) | Soft Pt (°C.) | Density (g/cm$^3$) |
|---|---|---|---|---|---|---|---|---|
| 1-1 | 0.01 | 91.1 | 900 | 4250 | 551 | 600 | 843 | 2.452 |
| 1-2 | 0.01 | 83.6 | 950 | 1498 | 560 | 609 | 844 | 2.444 |
| 1-3 | 0 | 80.1 | 1070 | nm | 602 | 652 | 900 | 2.432 |
| 1-4 | 0 | 74.6 | 1002 | 2210 | 589 | 644 | 922 | 2.403 |

A plurality of clad glass compositions, which can be suitable for use as a glass cladding layer of a structured article, were prepared according to the batch compositions listed in Table 3 below. Batches of the oxide constituent components were mixed, melted, and formed into glass plates. The properties of the glass melt and the resultant structured article were measured and the results are reported in Table 4. The etch rates reported in Table 4 are expressed in terms of weight loss relative to the original weight of the sample after contact by a 50 vol % aqueous HCl solution at 60° C. in an ultrasonic bath for 30 min.

TABLE 3

Exemplary Clad Glass Compositions

| Sample | SiO$_2$ (mol %) | Al$_2$O$_3$ (mol %) | B$_2$O$_3$ (mol %) | CaO (mol %) | Li$_2$O (mol %) | Na$_2$O (mol %) | K$_2$O (mol %) | SnO$_2$ (mol %) | ZrO$_2$ (mol %) | P$_2$O$_5$ (mol %) |
|---|---|---|---|---|---|---|---|---|---|---|
| 2-1 | 57 | 18.8 | 5 | 0 | 0 | 18.7 | 0.5 | 0.1 | 0.02 | 0 |
| 2-2 | 55 | 18.8 | 7 | 0 | 0 | 18.7 | 0.5 | 0.1 | 0.02 | 0 |
| 2-3 | 53 | 18.8 | 9 | 0 | 0 | 18.7 | 0.5 | 0.1 | 0.02 | 0 |
| 2-4 | 51 | 18.8 | 11 | 0 | 0 | 18.7 | 0.5 | 0.1 | 0.02 | 0 |
| 2-5 | 49 | 18.8 | 13 | 0 | 0 | 18.7 | 0.5 | 0.1 | 0.02 | 0 |
| 2-6 | 57 | 18.8 | 5 | 0 | 2 | 16.7 | 0.5 | 0.1 | 0.02 | 0 |
| 2-7 | 57 | 18.8 | 5 | 0 | 4 | 14.7 | 0.5 | 0.1 | 0.02 | 0 |
| 2-8 | 57 | 18.8 | 5 | 0 | 8 | 10.7 | 0.5 | 0.1 | 0.02 | 0 |
| 2-9 | 57 | 18 | 7 | 0 | 0 | 18 | 0 | 0.1 | 0 | 0 |
| 2-10 | 57 | 17 | 9 | 0 | 0 | 17 | 0 | 0.1 | 0 | 0 |
| 2-11 | 57 | 16 | 11 | 0 | 0 | 16 | 0 | 0.1 | 0 | 0 |
| 2-12 | 57 | 15 | 13 | 0 | 0 | 15 | 0 | 0.1 | 0 | 0 |
| 2-13 | 57.13 | 13.96 | 15.16 | 0.02 | 0 | 13.63 | 0 | 0.09 | 0 | 0 |
| 2-14 | 57 | 13 | 17 | 0 | 0 | 13 | 0 | 0.1 | 0 | 0 |
| 2-15 | 57.9 | 15 | 10 | 2 | 0 | 15 | 0 | 0.1 | 0 | 0 |
| 2-16 | 57.9 | 15 | 10 | 2 | 0 | 12 | 3 | 0.1 | 0 | 0 |
| 2-17 | 57.9 | 15 | 10 | 2 | 0 | 9 | 6 | 0.1 | 0 | 0 |
| 2-18 | 57.9 | 15 | 10 | 2 | 0 | 6 | 9 | 0.1 | 0 | 0 |
| 2-19 | 57.9 | 15 | 10 | 2 | 0 | 3 | 12 | 0.1 | 0 | 0 |
| 2-20 | 55 | 15 | 13 | 2 | 0 | 6 | 9 | 0.1 | 0 | 0 |
| 2-21 | 55 | 15 | 13 | 2 | 0 | 9 | 6 | 0.1 | 0 | 0 |
| 2-22 | 55 | 15 | 13 | 2 | 0 | 12 | 3 | 0.1 | 0 | 0 |
| 2-23 | 55 | 15 | 13 | 2 | 0 | 15 | 0 | 0.1 | 0 | 0 |
| 2-24 | 53 | 15 | 15 | 2 | 0 | 6 | 9 | 0.1 | 0 | 0 |
| 2-25 | 53 | 15 | 15 | 2 | 0 | 9 | 6 | 0.1 | 0 | 0 |
| 2-26 | 53 | 15 | 15 | 2 | 0 | 12 | 3 | 0.1 | 0 | 0 |
| 2-27 | 53 | 15 | 15 | 2 | 0 | 15 | 0 | 0.1 | 0 | 0 |
| 2-28 | 51 | 15 | 17 | 2 | 0 | 6 | 9 | 0.1 | 0 | 0 |
| 2-29 | 51 | 15 | 17 | 2 | 0 | 9 | 6 | 0.1 | 0 | 0 |
| 2-30 | 51 | 15 | 17 | 2 | 0 | 12 | 3 | 0.1 | 0 | 0 |
| 2-31 | 51 | 15 | 17 | 2 | 0 | 15 | 0 | 0.1 | 0 | 0 |
| 2-32 | 56 | 16 | 11 | 2 | 0 | 16 | 0 | 0.07 | 0 | 0 |
| 2-33 | 56 | 16 | 11 | 4 | 0 | 16 | 0 | 0.07 | 0 | 0 |
| 2-34 | 56 | 18 | 7 | 1 | 0 | 18 | 0 | 0.07 | 0 | 0 |
| 2-35 | 56 | 18 | 7 | 2 | 0 | 18 | 0 | 0.07 | 0 | 0 |

TABLE 3-continued

Exemplary Clad Glass Compositions

| Sample | SiO$_2$ (mol %) | Al$_2$O$_3$ (mol %) | B$_2$O$_3$ (mol %) | CaO (mol %) | Li$_2$O (mol %) | Na$_2$O (mol %) | K$_2$O (mol %) | SnO$_2$ (mol %) | ZrO$_2$ (mol %) | P$_2$O$_5$ (mol %) |
|---|---|---|---|---|---|---|---|---|---|---|
| 2-36 | 56 | 18 | 7 | 4 | 0 | 18 | 0 | 0.07 | 0 | 0 |
| 2-37 | 55 | 17 | 11 | 0 | 0 | 17 | 0 | 0.07 | 0 | 0 |
| 2-38 | 54 | 17.5 | 11 | 0 | 0 | 17.5 | 0 | 0.07 | 0 | 0 |
| 2-39 | 53 | 18 | 11 | 0 | 0 | 18 | 0 | 0.07 | 0 | 0 |
| 2-40 | 55 | 16 | 13 | 0 | 0 | 16 | 0 | 0.07 | 0 | 0 |
| 2-41 | 54 | 16 | 14 | 0 | 0 | 16 | 0 | 0.07 | 0 | 0 |
| 2-42 | 53 | 16 | 15 | 0 | 0 | 16 | 0 | 0.07 | 0 | 0 |
| 2-43 | 57 | 17.5 | 7 | 0 | 0 | 18.5 | 0 | 0.1 | 0 | 0 |
| 2-44 | 57 | 17 | 7 | 0 | 0 | 19 | 0 | 0.1 | 0 | 0 |
| 2-45 | 57 | 16.5 | 7 | 0 | 0 | 19.5 | 0 | 0.1 | 0 | 0 |
| 2-46 | 57 | 16 | 7 | 0 | 0 | 20 | 0 | 0.1 | 0 | 0 |
| 2-47 | 57 | 15.5 | 7 | 0 | 0 | 20.5 | 0 | 0.1 | 0 | 0 |
| 2-48 | 57 | 15 | 7 | 0 | 0 | 21 | 0 | 0.1 | 0 | 0 |
| 2-49 | 49 | 15 | 19 | 2 | 0 | 15 | 0 | 0.1 | 0 | 0 |
| 2-50 | 47 | 15 | 21 | 2 | 0 | 15 | 0 | 0.1 | 0 | 0 |
| 2-51 | 45 | 15 | 23 | 2 | 0 | 15 | 0 | 0.1 | 0 | 0 |
| 2-52 | 57 | 16 | 11 | 10 | 0 | 16 | 0 | 0.1 | 0 | 0 |
| 2-53 | 57 | 14.5 | 14 | 0 | 0 | 14.5 | 0 | 0 | 0 | 0 |
| 2-54 | 57 | 15 | 13 | 2 | 0 | 15 | 0 | 0 | 0 | 0 |
| 2-55 | 57 | 14.5 | 14 | 2 | 0 | 14.5 | 0 | 0 | 0 | 0 |
| 2-56 | 57 | 14 | 15 | 2 | 0 | 14 | 0 | 0 | 0 | 0 |
| 2-57 | 57 | 17.5 | 7 | 1 | 0 | 18.5 | 0 | 0.1 | 0 | 0 |
| 2-58 | 57 | 17.5 | 7 | 2 | 0 | 18.5 | 0 | 0.1 | 0 | 0 |
| 2-59 | 57 | 17.5 | 7 | 0 | 0 | 19.5 | 0 | 0.1 | 0 | 0 |
| 2-60 | 57 | 17.5 | 7 | 0 | 0 | 18.5 | 0 | 0.1 | 0 | 3 |
| 2-61 | 57 | 17.5 | 7 | 0 | 0 | 18.5 | 0 | 0.1 | 0 | 6 |
| 2-62 | 53 | 14.5 | 17 | 1 | 0 | 14.5 | 0 | 0.1 | 0 | 0 |
| 2-63 | 51 | 14.75 | 18 | 1.5 | 0 | 14.75 | 0 | 0.1 | 0 | 0 |
| 2-64 | 57 | 18.8 | 5 | 0 | 0 | 18.7 | 0.5 | 0.1 | 0.02 | 0 |
| 2-65 | 57 | 18 | 7 | 10 | 0 | 18 | 0 | 0.1 | 0 | 0 |
| 2-66 | 57 | 17 | 9 | 10 | 0 | 17 | 0 | 0.1 | 0 | 0 |
| 2-67 | 57 | 17.5 | 7 | 4 | 0 | 18.5 | 0 | 0.1 | 0 | 0 |
| 2-68 | 60 | 15.38 | 0 | 0 | 0 | 16.49 | 0 | 0.1 | 0 | 5.15 |

TABLE 4

Properties of Exemplary Clad Glass Compositions

| Sample | Etch Rate (%) | CTE (×10$^{-7}$/°C.) | Liquidus Temp (°C.) | Liquidus Visc (kP) | Strain Pt (°C.) | Anneal Pt (°C.) | Soft Pt (°C.) | Density (g/cm$^3$) |
|---|---|---|---|---|---|---|---|---|
| 2-1 | 22.85 | 92.7 | 1085 | 573 | 612 | 668 | 925 | 2.428 |
| 2-2 | 16.89 | 92.6 | 1035 | 584 | 581 | 633 | 881 | 2.410 |
| 2-3 | 12.55 | 92.6 | 985 | 824 | 557 | 608 | 847 | 2.420 |
| 2-4 | 23.73 | 92.4 | 950 | 898 | 539 | 588 | 813 | 2.401 |
| 2-5 | 28.92 | 92.8 | 900 | >2000 | 522 | 570 | 789 | 2.388 |
| 2-6 | 1.96 | 92.5 | 1030 | 776 | 580 | 634 | 883 | 2.428 |
| 2-7 | 0.94 | 89.8 | 970 | 1326 | 557 | 607 | 849 | 2.427 |
| 2-8 | 13.67 | 84.7 | 1000 | 233 | 541 | 590 | 814 | 2.410 |
| 2-9 | 9.28 | 85.0 | 910 | >2000 | 569 | 624 | 864 | 2.407 |
| 2-10 | 6.76 | 88.0 | 790 | >2000 | 594 | 648 | 899 | 2.385 |
| 2-11 | 6.29 | 79.1 | 775 | >2000 | 524 | 576 | 821 | 2.369 |
| 2-12 | 3.33 | 82.3 | 770 | >2000 | 544 | 596 | 842 | 2.350 |
| 2-13 | 2.13 | 73.0 | 742 | >2000 | 493 | 541 | 779 | 2.330 |
| 2-14 | 2.53 | 74.9 | 760 | >2000 | 508 | 557 | 790 | 2.310 |
| 2-15 | 1.55 | 76.4 | 950 | 1106 | 543 | 591 | 819 | 2.394 |
| 2-16 | 1.94 | 82.1 | 770 | >2000 | 535 | 583 | 814 | 2.394 |
| 2-17 | 2.99 | 85.1 | 750 | >2000 | 526 | 577 | 819 | 2.392 |
| 2-18 | 5.25 | 87.0 | 940 | >2000 | 528 | 578 | 836 | 2.388 |
| 2-19 | 10.31 | 87.7 | 1155 | 68 | 536 | 589 | 849 | 2.384 |
| 2-20 | 5.09 | 87.5 | 770 | >2000 | 516 | 565 | 809 | 2.370 |
| 2-21 | 7.15 | 85.8 | 795 | >2000 | 513 | 561 | 789 | 2.377 |
| 2-22 | 4.59 | 84.6 | 760 | >2000 | 514 | 559 | 772 | 2.382 |
| 2-23 | 5.31 | 79.5 | 750 | >2000 | 526 | 571 | 776 | 2.385 |
| 2-24 | 9.19 | 87.1 | 750 | >2000 | 503 | 552 | 777 | 2.357 |
| 2-25 | 5.73 | 86.3 | 775 | >2000 | 498 | 544 | 760 | 2.366 |
| 2-26 | 3.97 | 84.1 | 770 | >2000 | 502 | 547 | 749 | 2.374 |
| 2-27 | 6.09 | 79.2 | 795 | >2000 | 511 | 554 | 744 | 2.377 |
| 2-28 | 9.89 | 85.4 | 715 | >2000 | 491 | 538 | 760 | 2.348 |
| 2-29 | 10.74 | 86.5 | 735 | >2000 | 487 | 533 | 735 | 2.355 |
| 2-30 | 14.37 | 84.9 | 750 | >2000 | 491 | 534 | 731 | 2.364 |

TABLE 4-continued

Properties of Exemplary Clad Glass Compositions

| Sample | Etch Rate (%) | CTE (×10$^{-7}$/° C.) | Liquidus Temp (° C.) | Liquidus Visc (kP) | Strain Pt (° C.) | Anneal Pt (° C.) | Soft Pt (° C.) | Density (g/cm$^3$) |
|---|---|---|---|---|---|---|---|---|
| 2-31 | 9.73 | 79.4 | 790 | >2000 | 501 | 544 | 726 | 2.368 |
| 2-32 | 5.28 | 81.3 | 765 | >2000 | 521 | 566 | 769 | 2.405 |
| 2-33 | 6.34 | 80.9 | 910 | 294 | 524 | 566 | 753 | 2.435 |
| 2-34 | 12.74 | 88.4 | 1000 | 524 | 555 | 604 | 837 | 2.425 |
| 2-35 | 15.12 | 87.8 | 1000 | 281 | 545 | 591 | 813 | 2.439 |
| 2-36 | 14 | 87.4 | 1030 | 59 | 544 | 589 | 797 | 2.465 |
| 2-37 | 15.76 | 87.1 | 760 | >2000 | 523 | 570 | 800 | 2.385 |
| 2-38 | 17.13 | 88.2 | 750 | >2000 | 521 | 571 | 800 | 2.388 |
| 2-39 | 17.13 | 90.2 | 840 | >2000 | 521 | 570 | 794 | 2.394 |
| 2-40 | 7.86 | 83.6 | 800 | >2000 | 503 | 551 | 785 | 2.365 |
| 2-41 | 7.84 | 83.1 | 770 | >2000 | 495 | 544 | 770 | 2.361 |
| 2-42 | 12.58 | 82.8 | 800 | >2000 | 492 | 540 | 762 | 2.356 |
| 2-43 | 12.28 | 90.8 | 1000 | 773 | 553 | 601 | 841 | 2.428 |
| 2-44 | 12.89 | 91.4 | 990 | 366 | 545 | 592 | 821 | 2.432 |
| 2-45 | 22.9 | 92.7 | 970 | 292 | 534 | 577 | 771 | 2.442 |
| 2-46 | 22.1 | 92.1 | 970 | 149 | 528 | 572 | 766 | 2.450 |
| 2-47 | 24.44 | 94.5 | 960 | 90 | 524 | 564 | 743 | 2.459 |
| 2-48 | 28.93 | 94.5 | 950 | 89 | 519 | 559 | 735 | 2.461 |
| 2-49 | 22.85 | 80.0 | 765 | >2000 | 493 | 533 | 712 | 2.367 |
| 2-50 | 16.21 | 79.3 | 750 | >2000 | 484 | 525 | 702 | 2.355 |
| 2-51 | 16.89 | 80.0 | 775 | 1171 | 476 | 517 | 688 | 2.346 |
| 2-52 | 8.56 | 82.7 | 935 | 66 | 534 | 574 | 736 | 2.495 |
| 2-53 | 2.44 | 79.3 | 735 | >2000 | 508 | 556 | 798 | 2.343 |
| 2-54 | 2.68 | 78.5 | 795 | >2000 | 519 | 561 | 764 | 2.391 |
| 2-55 | 2.9 | 77.1 | 840 | >2000 | 515 | 557 | 744 | 2.382 |
| 2-56 | 2.14 | 75.9 | 765 | >2000 | 510 | 553 | 741 | 2.375 |
| 2-57 | 15.1 | 90.3 | 1010 | 150 | 534 | 579 | 798 | 2.442 |
| 2-58 | 9.66 | 89.6 | 1020 | 85 | 530 | 573 | 784 | 2.452 |
| 2-59 | 16.69 | 93.1 | 1020 | 150 | 532 | 576 | 791 | 2.439 |
| 2-60 | 3.02 | 89 | 800 | >2000 | 530 | 581 | 823 | 2.404 |
| 2-61 | 0.51 | 87.8 | 810 | >2000 | 514 | 564 | 800 | 2.395 |
| 2-62 | 2.84 | 76.7 | 740 | >2000 | 502 | 546 | 763 | 2.348 |
| 2-63 | 4.19 | 78 | 775 | >2000 | 500 | 542 | 737 | 2.355 |
| 2-64 | 15.63 | 94.5 | 970 | 414 | 609 | 664 | 928 | 2.427 |
| 2-65 | 14.96 | 87.5 | 1070 | 10 | 544 | 584 | 762 | 2.513 |
| 2-66 | 13.29 | 83.6 | 990 | 28 | 534 | 573 | 739 | 2.508 |
| 2-67 | 13.1 | 88.9 | 1020 | 42 | 531 | 574 | 764 | 2.473 |
| 2-68 | 0.05 | 84.4 | 990 | >2000 | 630 | 704 | 957 | 2.422 |

As shown in Tables 2 and 4, the exemplary clad glass compositions are less durable (e.g., have higher etch rates) than the exemplary core glass compositions in the selected etchant (e.g., 50% HCl).

A structured article is formed as described herein and comprises a glass core layer formed from an exemplary core glass composition (e.g., Sample 1-1 to 1-4) and a glass cladding layer formed from an exemplary clad glass composition (e.g., Sample 2-1 to 2-68).

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A method for forming a via in a glass article, the method comprising:
    forming one or more cavities within a glass substrate by exposing the glass substrate to an etchant, the glass substrate comprising: (i) a glass cladding layer and a glass central core layer and (ii) an upper glass cladding layer coupled to a surface of the glass central core layer, wherein the glass cladding layer has an etch rate in the etchant that is different than an etch rate of the glass central core layer, and wherein the one or more cavities extend through the glass central core layer terminating at the glass cladding layer;
    depositing a metallic material within the one or more cavities; and
    removing the glass cladding layer; the method further comprising removing the upper glass cladding layer prior to forming the one or more cavities within the glass substrate.

2. The method of claim 1, wherein the glass cladding layer has a photosensitivity that is lower than a photosensitivity of the glass central core layer.

3. The method of claim 1, wherein the glass cladding layer is a lower glass cladding layer and the upper glass cladding layer is coupled to a surface of the glass central core layer opposite of the lower glass cladding layer.

4. The method of claim 3, wherein the one or more cavities are formed within the upper glass cladding layer.

5. The method of claim 1, wherein the etchant used to form the one or more cavities is a second etchant, and wherein removing the upper glass cladding layer comprises exposing the upper glass cladding layer to a first etchant that is different than the second etchant.

6. A method for forming a via in a glass article, the method comprising:
    forming one or more cavities within a glass substrate by exposing the glass substrate to an etchant, the glass substrate comprising a glass cladding layer and a glass central core layer, wherein the glass cladding layer has an etch rate in the etchant that is different than an etch rate of the glass central core layer, and wherein the one or more cavities extend through the glass central core layer terminating at the glass cladding layer;

depositing a metallic material within the one or more cavities; and removing the glass cladding layer, wherein the glass cladding layer is a lower glass cladding layer and the glass substrate further comprises an upper glass cladding layer coupled to a surface of the glass central core layer opposite of the lower glass cladding layer, wherein the one or more cavities are formed within the upper glass cladding layer, wherein forming the one or more cavities within the upper glass cladding layer comprises exposing the upper glass cladding layer to a first etchant, and wherein forming the one or more cavities within the glass central core layer comprises exposing the glass central core layer to a second etchant that is different than the first etchant.

7. A method for forming a via in a glass article, the method comprising:

forming one or more cavities within a glass substrate by exposing the glass substrate to an etchant, the glass substrate comprising a glass cladding layer and a glass central core layer, wherein the glass cladding layer has an etch rate in the etchant that is different than an etch rate of the glass central core layer, and wherein the one or more cavities extend through the glass central core layer terminating at the glass cladding layer;

depositing a metallic material within the one or more cavities; and removing the glass cladding layer, wherein the glass cladding layer is a lower glass cladding layer and the glass substrate further comprises an upper glass cladding layer coupled to a surface of the glass central core layer opposite of the lower glass cladding layer, wherein the etchant used to form the one or more cavities is a second etchant, and wherein removing the lower glass cladding layer comprises exposing the lower glass cladding layer to a first etchant that is different than the second etchant.

8. A method for forming a via in a glass article, the method comprising:

forming one or more cavities within a glass substrate by exposing the glass substrate to an etchant, the glass substrate comprising an upper glass cladding layer, a glass central core layer, and a lower glass cladding layer, wherein the one or more cavities extend through the upper glass cladding layer, and wherein the upper glass cladding layer and the lower glass cladding layer have an etch rate in the etchant that is different than an etch rate of the glass central core layer;

depositing metallic material within the one or more cavities of the upper glass cladding layer; and removing the lower glass cladding layer from the glass substrate; and further comprising removing the glass central core layer from the glass substrate.

9. The method of claim 8, wherein the etchant used to form the one or more cavities is a first etchant, and wherein removing the glass central core layer from the glass substrate comprises exposing the glass central core layer to a second etchant that is different than the first etchant.

10. The method of claim 8, wherein removing the lower glass cladding layer comprises exposing the lower glass cladding layer to the first etchant.

11. The method of claim 8, wherein forming the one or more cavities comprises forming the one or more cavities to extend through the upper glass cladding layer and the glass central core layer, terminating at the lower glass cladding layer.

12. The method of claim 8, wherein forming the one or more cavities in the upper glass cladding layer comprises exposing the upper glass cladding layer to electromagnetic radiation.

\* \* \* \* \*